United States Patent [19]

Tsunoda et al.

[11] Patent Number: 4,556,965
[45] Date of Patent: Dec. 3, 1985

[54] INFORMATION RECORDING APPARATUS HAVING AUTOMATIC FOCUSING

[75] Inventors: Yoshito Tsunoda, Mitaka; Toshimitsu Miyauchi, Hachioji; Kazuo Shigematsu, Kawasaki, all of Japan

[73] Assignee: Hitachi, Ltd., Tokyo, Japan

[21] Appl. No.: 241,728

[22] Filed: Mar. 9, 1981

Related U.S. Application Data

[63] Continuation of Ser. No. 22,947, Mar. 22, 1979, abandoned.

[30] Foreign Application Priority Data

Apr. 7, 1978 [JP] Japan ................................. 53-40334

[51] Int. Cl.[4] ........................ G11B 7/00; G11B 21/10
[52] U.S. Cl. ........................................ 369/45; 369/46; 369/112; 369/121
[58] Field of Search ................ 369/45, 46, 112, 116, 369/121

[56] References Cited

U.S. PATENT DOCUMENTS

| | | | |
|---|---|---|---|
| 3,614,456 | 10/1971 | Hamisch | 250/234 |
| 3,893,129 | 7/1975 | Endo et al. | 346/76 L X |
| 3,925,603 | 12/1975 | Naruse et al. | 369/45 X |
| 3,992,574 | 11/1976 | Bouwhuis et al. | 369/112 X |
| 4,051,527 | 9/1977 | Braat | 358/128.5 |
| 4,059,841 | 11/1977 | Bricot et al. | 250/201 |
| 4,065,786 | 12/1977 | Stewart | 369/46 |
| 4,069,487 | 1/1978 | Kasai et al. | 346/135.1 X |
| 4,110,607 | 8/1978 | Honjo et al. | 358/128.5 X |
| 4,118,736 | 10/1978 | Okada et al. | 358/128.5 |
| 4,163,149 | 7/1979 | Sawano et al. | 369/45 X |
| 4,198,657 | 4/1980 | Kanamaru | 358/128.5 |
| 4,283,785 | 8/1981 | Miyauchi et al. | 369/116 |
| 4,293,944 | 10/1981 | Izumita et al. | 369/45 |
| 4,310,911 | 1/1982 | Fujishima | 369/45 |
| 4,310,912 | 1/1982 | Kikuchi et al. | 369/45 X |

Primary Examiner—Aristotelis M. Psitos
Attorney, Agent, or Firm—Antonelli, Terry & Wands

[57] ABSTRACT

In an information recording apparatus for recording predetermined information on a recording medium by means of a laser beam, an optical system and a light detector are arranged for detecting a reflected version of the laser beam from the recording medium, whereby the focusing of the laser beam on the recording medium is automatically controlled.

18 Claims, 7 Drawing Figures

INFORMATION RECORDING APPARATUS HAVING AUTOMATIC FOCUSING

This is a continuation of application Ser. No. 022,947, filed Mar. 22, 1979.

The invention relates to an apparatus for optically recording information on a recording medium, and more particularly, simple and inexpensive optical video disc recording apparatus or optical data recording apparatus.

The invention as well as the prior art will be explained in conjunction with the accompanying drawings, in which:

FIG. 1b is a circuit diagram for explaining an automatic focusing operation employed in the apparatus of FIG. 1a;

FIG. 2b illustrates detection regions of the light detector shown in FIG. 2a;

An optical video disc for optically recording information or a disc for recording only data has various applications as a memory with a large storage since information can be recorded with high density. Since the information must be recorded on the disc as an arrangement of pits or recesses each with an approximately 1 μm diameter, a recording laser beam must be accurately focused on the recording medium. Therefore, a conventional recording apparatus is provided with an automatic focusing device.

Typical one of the conventional automatic focusing devices uses an air-bearing system utilizing a static air pressure. In this type of device, a focusing lens is disposed within a holder having an air jetting nozzle and placed closest to the disc surface, and the pressure of air supplied from the nozzle constantly separates the focusing lens from the disc surface with a gap of 10 to 20 μm therebetween. When the surface of the disc rotating at the speed of for example, 1800 rpm moves wavily, the holder and lens combination correspondingly moves with the wavy movement so that the laser beam accurately focuses on a given location of the disc surface. This device is effectively operable for wavy disc movement with at most 20–30 μm and at a highest frequency of 30 Hz. When a plastic or thin glass plate which is not finished to optical polishing is used for the disc, the above-described focusing device cannot effectively operate under the use of such a disc.

Another conventional focusing device uses a signal for automatic focusing and detects the signal. This device uses an additional laser beam for the detection of the automatic focusing signal, in addition to an information recording laser beam. Therefore, the device must be provided with an additional laser source or the laser beam emitted from the same laser source must be split into a first laser beam for the recording of information and a second laser beam for the detection of the automatic focussing signal. An optical system employed for this type of device, therefore, has a considerably complicated construction, as shown in FIG. 1. Further, both the laser beams interfere with each other to deteriorate the precision of the automatic focusing.

Figure 1A:
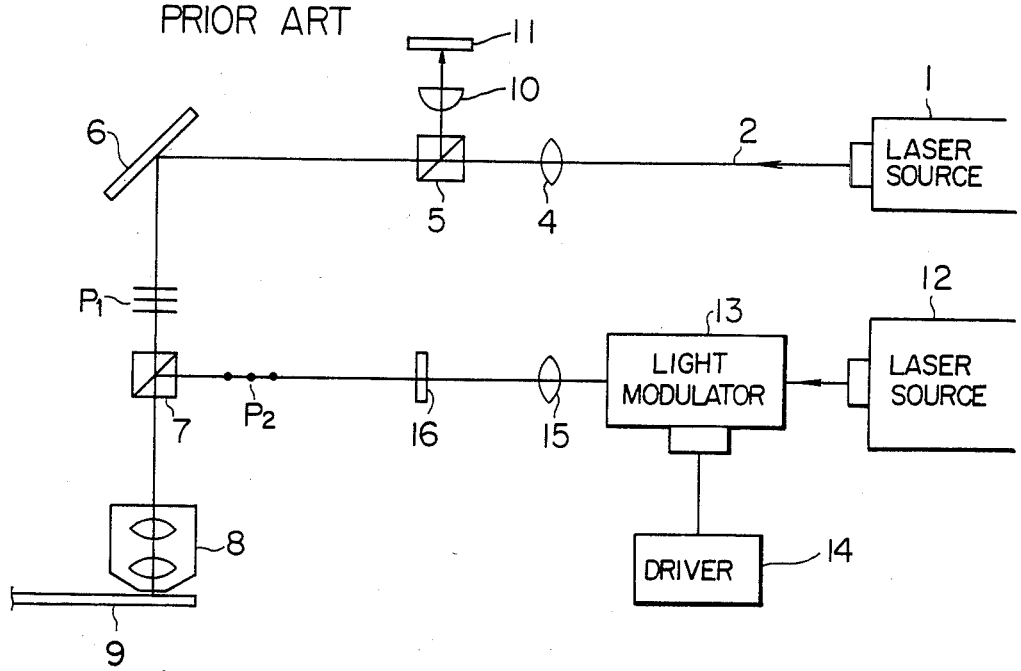
FIG. 1a is a schematic diagram of a conventional information recording apparatus.
Figure 1B:
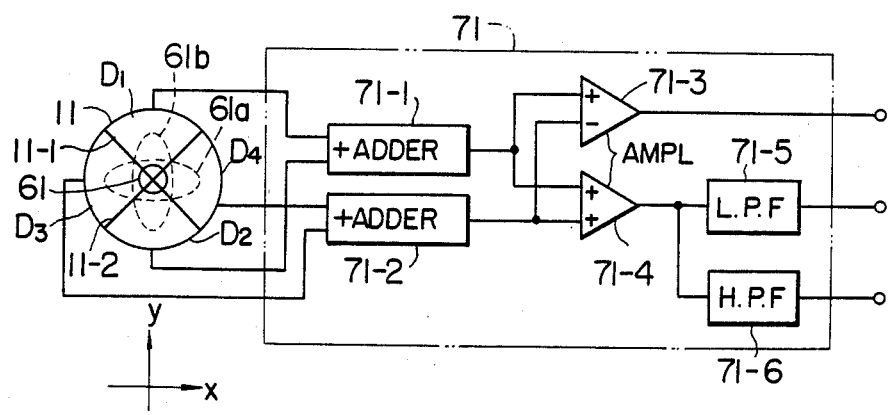

FIG. 1a shows a conventional recording device using two laser sources. A laser beam emitted from an information recording laser source 12 such as a high power Ar laser or a He—Ne laser enters a light modulator 13 driven by a driver circuit 14 and is therein modulated in accordance with information. After the modulated laser beam passes through a lens 15, a ½λ plate (half wavelength plate) 16 and a polarizing prism 7, it is focused by a focusing lens 8 onto a disc 9 in the form of a small spot. On the other hand, an automatic focusing laser beam 2 emitted from a small laser source 1 such as He—Ne laser of 1–2 mW passes through a lens 4, a half-mirror 5, a mirror 6 and the polarizing prism 7 and then is focused by the focusing lens 8 onto the disc 9. The laser beam reflected from the disc 9 is directed to a cylindrical lens 10 through the half-mirror 5 and is detected by a light detector 11. Since the polarization planes of the respective laser beams are crossed to each other as indicated by $P_1$ and $P_2$, those laser beams can be separated by the polarizing prism 7.

The automatic focusing operation by the combination of the cylindrical lens 10 and the light detector 11 is disclosed in U.S. Pat. Nos. 4,059,841 and 4,051,527. The operation will be briefly described with reference to FIG. 1b. Through a unidirectional focusing action of the cylindrical lens 10 located in a path of the reflected laser beam, a light spot on the light detector 11 changes in accordance with the change of a focused image of the beam on the surface of the disc 9. At a correct focusing, the light spot takes a circular spot as denoted by 61 in FIG. 1b. When the disc surface approaches to the lens 8, the light spot changes its shape into an upstanding elliptical shape 61b. On the other hand, when the disc surface moves away from the lens 8, the light spot changes into a horizontally laying elliptical shape 61a. As shown in the figure, the light detector 11 is quartered by boundary lines 11-1 and 11-2 into individual segmental regions $D_1$ to $D_4$ and produce output signals corresponding to a change in the shape of the light spot formed on the light detector 11. More especially, adders 71-1 and 71-2 respectively detect the components of the spot in Y- and X-directions, and a summing amplifier 71-3 produces a focus error signal. A tracking error signal is derived from an amplifier 71-4 and a low pass filter (L.P.F.) 71-5, and a video signal is derived from an amplifier 71-4 and a high pass filter (H.P.F.) 71-6. The focus error signal causes the wavy motion of the lens 8. For example, this may be done by disposing the lens 8 in a moving coil. Thus, the recording beam can be always focused at a correct position on the disc surface.

The information recording apparatus shown in FIG. 1a involves the following problems. A first problem is the construction of an optical system is complicated since the number of optical elements used is large. A second problem is that when the precision of the polarizing prism 7 is poor, the recording and focusing beams are incompletely separated so that they interfere with each other, resulting in poor precision of the automatic focusing. A third problem is that the laser beam reflected from the disc surface returns to the laser source 1 to produce random noise called "back-talk", thereby deteriorating the precision of the automatic focusing. A fourth problem is that the adjustment of an optical system for focusing coincidently the recording and focusing beams on the disc surface is difficult.

Accordingly, an object of the invention is to provide a simplified information recording apparatus which can provide high reliability and high precision.

According to the invention, there is provided an information recording apparatus comprising: a light source for emitting a first light beam; first means for applying predetermined information to said first light beam emitted from said light source; second means for directing said first light beam onto a predetermined recording medium; third means for detecting a second light beam which is a reflected version of said light beam from said recording medium; fourth means for producing an automatic focusing signal in accordance with an output from said third means; and fifth means responsive to an output from said fourth means for focusing said first light beam onto said recording medium.

Figure 2B:
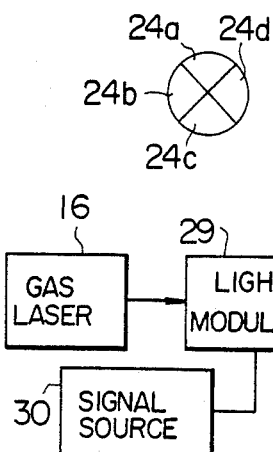
Figure 2A:
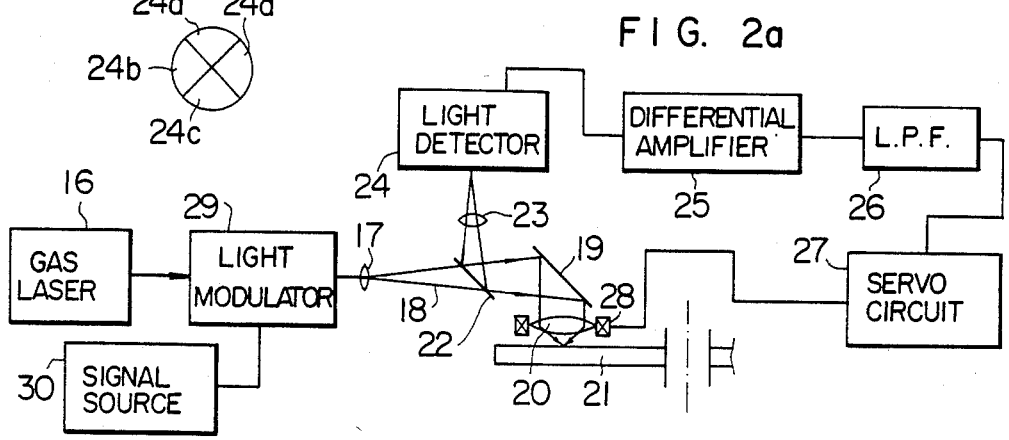
FIG. 2a is a schematic diagram of an information recording apparatus according to an embodiment of the invention.

Referring to FIG. 2a showing an information recording apparatus according to an embodiment of the invention, a laser beam 18 emitted from a gas laser 16 passes through a lens 17 and a mirror 19 and is then focuses by a focusing lens 20 on a disc 21 as a small spot. The disc 21 includes a recording medium and a substrate. The recording medium may be made of metal material (for example, Bi or Al) or Calcogenide glass material (for example, As, Ge, Te, Se or the like). The substrate may be made of glass or acrylate resin. The recording medium is deposited as a thin film of 100 to 1000 Å on the substrate. The information is recorded into the disc in the form of an arrangement of a number of pits which are thermally formed by the laser beam focused on the disc 21.

Figure 4A:
FIG. 4a shows a waveform of a pulsated laser beam incident on a disc.
Figure 4B:
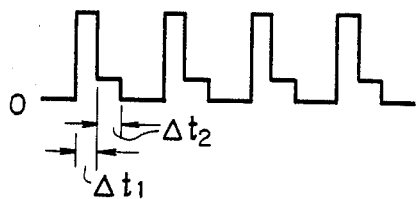
FIG. 4b shows a waveform of a laser beam reflected from the disc.

FIG. 4a shows a waveform of a pulsated laser beam incident onto the recording medium of the disc. The frequency of the pulsated beam is 2 to 4 MHz. FIG. 4b shows a waveform of the laser beam reflected from the recording medium. As from FIG. 4b, it is seen that during the time period of $\Delta t_1$, the incident laser beam heats the metal film with no pit formed therein so that the intensity of the reflected laser beam from the metal film surface is high. Though the intensity of the reflected laser beam depends on the thickness of the metal film, it is usual that 40 to 50% of the incident laser beam is reflected and the remaining is absorbed by the metal film to heat the same to a high temperature. After the period $\Delta t_1$, the metal film is pitted and the intensity of the reflected laser beam becomes very small. The laser beam reflected during the period $\Delta t_1$ may be used as a signal for automatic focusing. In the case of using a frequency modulated video signal as information, the reflected laser beam over the period $\Delta t_1$ exists for every frequency modulated pulse. The inventors' experiments have found that $\Delta t_1$ is $\frac{1}{3}$ to $\frac{1}{4}$ of the pulse width ($\Delta t_1 + \Delta t_2$).

Again referring to FIG. 2a, the the reflected laser beam from the disc 21 passes through a half-mirror 22 and a cylindrical lens 23 and enters a light detector 24 which has four light detecting regions 24a to 24d as shown in FIG. 2b. The laser beam reflected during the $\Delta t_1$ (see FIG. 4b) before the recording is made, is detected by the light detector 24. A signal representative of a deviation from the correct focusing point (a focus error signal) is produced in accordance with a well-known scheme. This scheme as disclosed in the aforementioned U.S. Pat. Nos. 4,059,841 and 4,051,527 has been described and shown in conjunction with FIG. 1b.

When the speed of rotation of the rotating disc is 1800 rpm, the focus error signal includes the frequency components from several tens Hz to several KHz which can be sampled by the frequency of an information signal. Namely, the focus error signal has its frequency equal to or lower than one-half of the frequency of the information signal. Therefore, after the detection by the light detector 24, a differential amplifier 25 produces in the amplified form a difference between the sum of the outputs from the detecting regions 24a and 24c and the sum of the outputs from the detecting regions 24b and 24d. The output signal from the differential amplifier 25 is applied to a low pass filter (L.P.F.) 26 having the cut-off frequency of about 100 KHz, in which only the focus error signal component is extracted. The focus error signal is applied to a servo circuit 27 which in turn drives a moving coil 28 to automatically perform a correct focusing.

In FIG. 2a, reference numeral 30 designates a signal source which generates a signal to be recorded. Numeral 29 designates a light modulator 29. Upon receipt of the signal, the light modulator modulates the laser beam 18.

Figure 3:
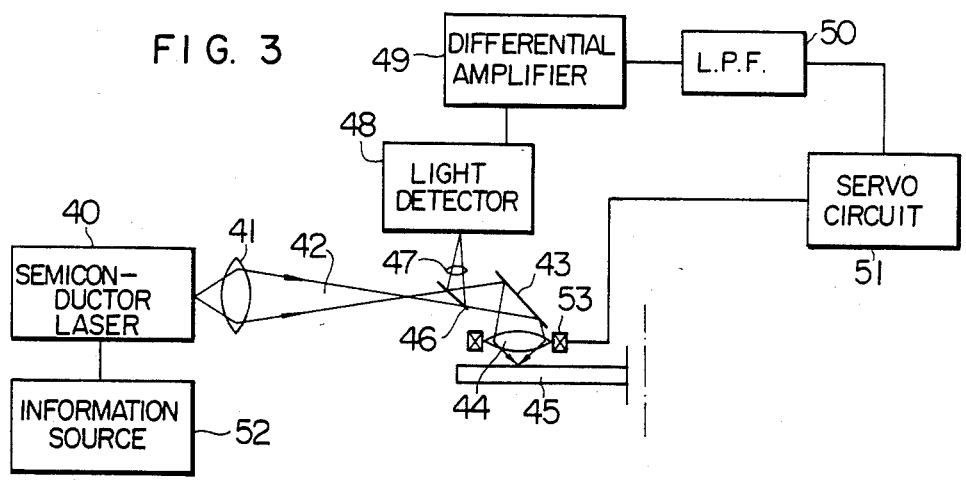
FIG. 3 is a schematic diagram of an information recording apparatus according to another embodiment of the invention.

FIG. 3 shows an information recording apparatus according to another embodiment of the invention. This embodiment employs a small and inexpensive semiconductor laser 40. A laser beam 42 emitted from the laser 40 passes through a lens 41 and a mirror 43 and is focused onto a disc 45 surface by a focusing lens 44. The laser beam reflected from the disc 45 passes through a half-mirror 46 and a cylindrical lens 47 and is then directed to a light detector 48 with the same construction as that shown in FIG. 2b. In a way similar to the embodiment shown in FIG. 2a, an output signal from the light detector 48 passes through a differential amplifier 49, a low pass filter (L.P.F.) 50 and a servo circuit 51 to drive a moving coil 53. The semiconductor laser 40 is directly coupled with an information source 52 so that a laser beam from the semiconductor laser 40 is directly modulated by a signal from the information source 52 into a pulsated form.

In the arrangements shown in FIGS. 2a and 3, it should be noted that if the differential amplifier 25 or 49 is provided with a low pass filtering characteristic, the low pass filter 26 or 50 may be omitted.

An information recording process in the embodiments in FIGS. 2a and 3 will be described. The lasing or oscillation in the laser source is first made with a weak output power which is lower than a recording threshold level of the recording medium. At this time, since the laser output is weak, no recording or pitting is made but only the automatic focusing is performed. Under this condition, the laser output power is increased so that the information recording starts. Then, though the focus error signal output correspondingly increases, such a degree of the input signal to an ordinary servo circuit causes no problem.

A recording medium material (e.g. photoresist) other than metal may be used as long as it can provide a weak reflecting light therefrom.

As described above, the invention provides an information recording apparatus in which the accurate recording of information is possible by use of a simplified optical system.

What is claimed is:

1. An information recording apparatus comprising:
a light source of emitting a first light beam;

first means for applying predetermined recording information to said first light beam emitted from said light source to produce a pulsated light beam;

second means for irradiating said pulsated light beam onto a predetermined recording medium, said recording medium having a reflectivity thereto to said pulsated light beam which lowers below a predetermined value during the period of irradiation of said pulsated light beam as a result of the formation of a pit in said recording medium;

third means for detecting a second light beam which is a reflected version of said pulsated light beam from said recording medium before the reflectivity of said recording medium lowers below said predetermined value;

fourth means for producing an automatic focusing signal in accordance with an output from said third means, said automatic focusing signal having a predetermined frequency relation to the frequency of the predetermined recording information so as to enable sampling of said automatic focusing signal by the frequency of the predetermined recording information, the predetermined frequency relation being that the frequency of said automatic focusing signal is equal to or lower than one-half of the frequency of the predetermined recording information; and fifth means responsive to an output from said fourth means for focusing said pulsated light beam onto said recording medium.

2. An information recording apparatus according to claim 1, wherein said fourth means includes a low pass filter for receiving the output from said third means.

3. An information recording apparatus according to claim 1, wherein said fourth means includes a differential amplifier.

4. An information recording apparatus according to claim 3, wherein said fourth means further includes a low pass filter connected to receive an output of said differential amplifier.

5. An information recording apparatus according to claim 1, wherein said third means detects the second light beam produced prior to the reflectivity of said recording medium being lowered below a predetermined value for enabling production of said automatic focusing signal by said fourth means.

6. An information recording apparatus comprising:
a gas laser for emitting a first light beam;
an information source for generating a recording information signal;
a light modulator for modulating said first light beam emitted from said gas laser in accordance with said recording information signal to produce a pulsated light beam;
a first optical system for irradiating said pulsated light beam onto a predetermined recording medium, said recording medium having a reflectivity thereof to said pulsated light beam which lowers below a predetermined value during the period of irradiation of said pulsated light beam as a result of the formation of a pit in said recording medium;
a light detector having a quartered light receiving surface for detecting a second light beam which is a reflected version of said pulsated light beam from said recording medium before the reflectivity of said recording medium lowers below said predetermined value;
a cylindrical lens positioned between said recording medium and said light detector for directing said second light beam to said light detector;
automatic focusing signal generating means for receiving an output from said light detector to produce an output of an automatic focusing signal, said automatic focusing signal having a predetermined frequency relation to the frequency of said recording information signal so as to enable sampling of said automatic focusing signal by the frequency of said recording information signal, the predetermined frequency relation being that the frequency of said automatic focusing signal is equal to or lower than one-half of the frequency of said recording information signal; and
a second optical system responsive to the output of said automatic focusing signal generating means for focusing said pulsated light beam onto said recording medium.

7. An information recording apparatus comprising:
an information source for generating a recording information signal;
a semiconductor laser element modulated in accordance with said recording information signal for emitting a first pulsated light beam;
a first optical system for irradiating said first pulsated light beam onto a predetermined recording medium, said recording medium having a reflectivity thereof to said first pulsated light beam which lowers below a predetermined value during the period of irradiation of said first pulsated light beam as a result of the formation of a pit in said recording medium;
a light detector having a quartered light receiving surface for detecting a second pulsated light beam which is a reflected version of said first pulsated light beam of said recording medium before the reflectivity of said recording medium lowers below said predetermined value;
a cylindrical lens positioned between said recording medium and said light detector for directing said second pulsated light beam to said light detector;
automatic focusing signal generating means for receiving an output from said light detector to produce an output of an automatic focusing signal, said automatic focusing signal having a predetermined frequency relation to the frequency of said recording information signal so as to enable sampling of said automatic focusing signal by the frequency of said recording information signal, the predetermined frequency relation being that the frequency of said automatic focusing signal is equal to or lower than one-half of the frequency of said recording information signal; and
a second optical system responsive to the output of said automatic focusing signal generating means for focusing said first pulsated light beam onto said recording medium.

8. An information recording apparatus according to claim 1, 6 or 7, wherein said recording medium is made of metal material.

9. An information recording apparatus according to claim 1, 6 or 7, wherein said recording medium is made of Calcogenide glass material.

10. An information recording apparatus according to claim 6 or 7, wherein said automatic focusing signal generating means includes a low pass filter.

11. An information recording apparatus according to claim 6 or 7, wherein said automatic focusing signal generating means includes a differential amplifier.

12. An information recording apparatus according to claim 11, wherein said automatic focusing signal generating means further includes a low pass filter connected to receive an output of said differential amplifier.

13. An information recording apparatus comprising:
light beam emitting means for emitting a pulsated light beam having an intensity thereof modulated in accordance with information to be recorded;
a recording medium irradiated with said pulsated light beam, said recording medium having a reflectivity thereof to said pulsated light beam which does not change during a predetermined period within the time of irradiation of said pulsated light beam and thereafter lowers as a result of the formation of an information pit in said recording medium;
a first optical system including a focusing lens for focusing said pulsated light beam onto said recording medium;
light detecting means for converting a reflected version of said pulsated light beam from said recording medium into an electric signal;
a second optical system for deriving reflected light which is a reflected version of said pulsated light beam from said recording medium and for introducing said reflected light to said light detecting means;
focus error signal detecting means for detecting a focus error signal in accordance with the portion of the output of said light detecting means which is present in said predetermined period in which the reflectivity of said recording medium does not change; and
means responsive to the output of said focus error signal detecting means for adjusting a distance of said focusing lens from said recording medium so that said pulsated light beam is correctly focused onto said recording medium during the recording of information thereon.

14. An information recording apparatus according to claim 13, wherein said focus error signal detecting means includes a low pass filter.

15. An information recording apparatus according to claim 14, wherein said light beam emitting means includes a semiconductor laser and an information source for generating an information signal which modulates said semiconductor laser.

16. An information recording apparatus according to claim 14, wherein said light beam emitting means includes a gas laser, a light modulator for modulating a light beam from said gas laser, and an information source for generating an information signal which drives said light modulator.

17. An information recording apparatus according to claim 13, wherein said light beam emitting means includes a semiconductor laser and an information source for generating an information signal which modulates said semiconductor laser.

18. An information recording apparatus according to claim 13, wherein said light beam emitting means includes a gas laser, a light modulator for modulating a light beam from said gas laser, and an information source for generating an information signal which drives said light modulator.

* * * * *